Sept. 22, 1942.   F. G. WEISBECKER   2,296,303
ART OF SEAMING
Filed Aug. 26, 1940   4 Sheets-Sheet 1

Inventor
FRANK G. WEISBECKER,

By
Attorney.

Sept. 22, 1942.                F. G. WEISBECKER                 2,296,303
                                 ART OF SEAMING
                              Filed Aug. 26, 1940            4 Sheets-Sheet 2

Inventor
FRANK G. WEISBECKER,

Attorney

Sept. 22, 1942.  F. G. WEISBECKER  2,296,303
ART OF SEAMING
Filed Aug. 26, 1940    4 Sheets-Sheet 3

Inventor
FRANK G. WEISBECKER,
By
Attorney

Patented Sept. 22, 1942

2,296,303

UNITED STATES PATENT OFFICE 2,296,303

ART OF SEAMING

Frank G. Weisbecker, Glenside, Pa., assignor to Hosiery Patents Incorporated, Lansdale, Pa., a corporation of Pennsylvania Application August 26, 1940, Serial No. 354,282

39 Claims. (Cl. 66—178)

This invention relates to the art of seaming, and more particularly to a method for seaming fabric and to the article produced by such method.

The present invention offers special and important advantages when applied to full-fashioned, flat knit hosiery and will, therefore, be illustrated and described in connection with such hosiery and its production. Other applications of this invention, however, will be readily apparent from an understanding of the following description and the accompanying drawings.

Conventional full-fashioned hosiery is usually formed from a flat knit hosiery blank comprising a welt fabric, a leg fabric, heel tab fabric, instep fabric, sole fabric, and toe fabric. This hosiery blank usually has a selvage construction for its side edges and a course of free, terminal wale loops at the end edge of each of the heel tabs and the toe fabric. Heretofore, the general practice has been to seam these end edges of the heel tabs and toe fabric by a conventional looping operation which is performed on a special machine—termed in the art as a looping machine. After the looping operation, the remainder of the usual hosiery seam is formed by sewing together the selvage edges on a sewing machine.

A special looping machine has been used for seaming the terminal or end courses of the heel tabs and toe fabric, as each and every one of the loops in these courses must be bound and locked in the seam to avoid the possibility of any terminal loop being free to start a stocking run. As stocking selvages have an anti-run construction, it is unnecessary that each and every selvage loop, or each and every loop in the outermost wale of a selvage edge, be individually locked into the selvage seam or seams. For this reason, it has been possible to seam the stocking selvages on an ordinary sewing machine.

This invention provides a novel and improved method for seaming stocking fabric edges and also a novel and improved structure for stocking seams. The method of this invention is relatively simple in detail, is relatively inexpensive, and does not require any special skill for its execution. The method furthermore may be carried out on a relatively simple and inexpensive machine, and may be followed to produce highly attractive hosiery with efficient and durable seam structure. The seams may be so formed as to present an artistic appearance and may have a knitted appearance corresponding to that of the stocking fabric.

According to this invention, the entire stocking, although of flat fabric, may be composed of knitted material, and may be without any "sewed" or "looped" seams. This invention also shows how the stocking leg and sole may be provided with a knitted seam, in place of the prior art sewed seam.

A number of objections to the prior practice of sewing and looping stocking seams may be pointed out here. The conventional looped and sewed seams are substantially thicker than the stocking fabric and appear as ridges projecting from the fabric of the finished stocking. These ridges not only detract from the stocking appearance, but also detract from the comfort of the wearer. When conventional stockings are worn, their thick seams press into the flesh of the wearer, particularly where the seam is between the individual's foot and shoe. If the stocking is tight fitting, its thick leg seam will form a line or depression along the back of the wearer's leg. Therefore, the thick stocking seams of the prior art may not only be uncomfortable, but may also produce unattractive marks in the flesh of the person wearing the stockings.

The present invention overcomes the noted objections in the prior art seams and provides a seam which is relatively flat in construction and appearance, and which may be of such character as to add to the attractiveness of the hosiery in which it is provided.

It is thought by some that a line in a stocking at the back leg seam contributes to the shapely appearance of the leg of the wearer. This line effect may be provided by the seam of this invention. At the same time, the thick seam structures of the prior art may be avoided.

The present invention may be followed to produce a relatively narrow and smooth or flat construction for a stocking seam, which improves the general appearance of the stocking and is as attractive and comfortable as the remainder of the stocking when worn. In its preferred form, this invention also provides a seam structure which avoids the flesh marks that follow the use of conventional stockings having thick seams.

In a preferred embodiment of this invention, the selvages of a stocking are interknitted with narrow knitted fabric to provide a novel and improved stocking seam. The seams for the end courses of the toe fabric and the heel tabs may also be of knitted construction.

The conventional looping operation for forming looped seams has the further disadvantage that it requires special looping machines and expert looping machine operators.

It is, therefore, an object of this invention to provide an improved method for seaming knitted articles and an improved seam made by such method.

A further object is to provide a novel method for knitting a seam for selvage edges.

Still another object is to provide a knitted seam for the selvages of hosiery made from flat knit fabric and a method for knitting such seams.

Another object is to provide substantially narrow, flat and smooth knitted seams for the selvages of hosiery.

Still another object is to provide full-fashioned, flat knit hosiery, which is formed entirely of knitted fabric.

Another object is to provide a full-fashioned, flat knit stocking, which has all of its seams produced by narrow knitted fabric interknit with the edges to be united or joined by a seam.

Other objects and advantages will be evident from an understanding of the following description, the appended claims, and the accompanying drawings which illustrate this invention.

In the accompanying drawings.

Figure 1:
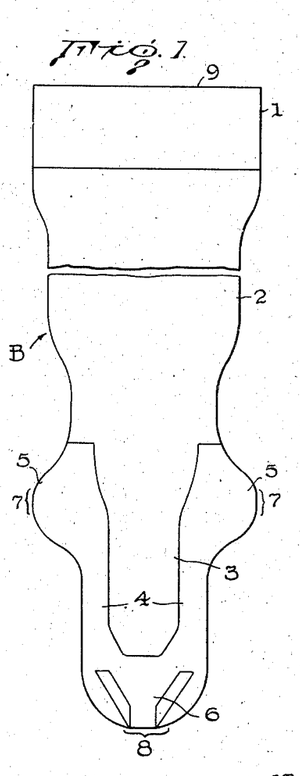
Figure 1 is a plan view of a complete stocking blank.
Figure 3:
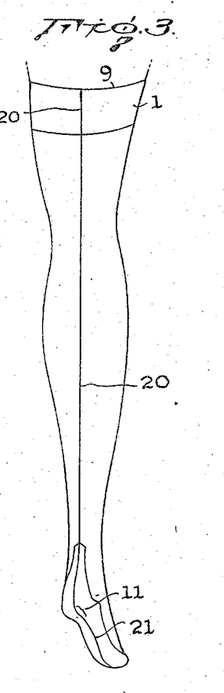
Figure 3 is a perspective view of a stocking formed from the blank of Figure 1 in accordance with this invention.

Referring now to the drawings, this invention may be followed in forming a stocking as illustrated in Figure 3 from a stocking blank B as illustrated in Figure 1. It will of course be clear from an understanding of this invention that it may also be applied to the making of hosiery from other types of stocking blanks.

The stocking blank of Figure 1 may be flat knit and may be produced on a full-fashioned hosiery, straight knitting machine. This stocking blank comprises knitted fabric forming a welt 1, a leg portion 2, an instep portion 3, sole portions 4, heel tabs 5, and a toe portion 6.

According to conventional practice, the heel tab edges and the toe edge indicated by the brackets 7 and 8, respectively, are each formed by an end course or row of free terminal wale loops. Conventional practice also provides a selvage construction for the remaining side edges of the stocking, these selvage edges extending between the toe edge 8 and the heel tab edges 7 and between the heel tab edges 7 and the top edge 9 of the welt 1.

Figure 2:
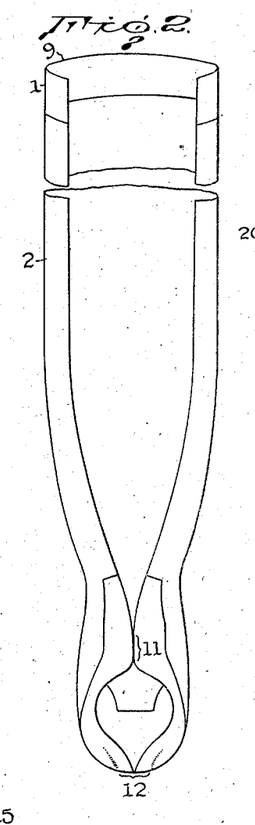
Figure 2 illustrates the stocking blank of Figure 1 as it appears after being provided with heel and toe seams.

In forming a stocking from the blank of the Figure 1, the usual practice is to first seam the heel tab and toe edges 7 and 8. The heel tab edges 7 are united to form a heel tab seam 11, and outer portions of the toe edge 8 are united to the inner portions thereof to form a toe seam 12. The stocking blank will now appear as illustrated in Figure 2.

The heel and toe seams 11 and 12 of a stocking embodying this invention may be formed on the usual looping machines, but preferably are formed on a knitting machine and according to the disclosures of application Serial No. 188,579, filed February 3, 1938, by Frank G. Weisbecker, and application Serial No. 304,594, filed November 15, 1939, by Frank G. Weisbecken and William W. Fleming.

Figure 4:
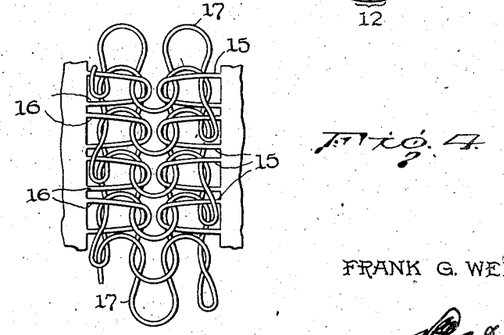
Figure 4 is a more or less diagrammatic illustration of the loop structure in the heel and toe seams of the stocking shown in Figure 3.

In knitting the seams 11 and 12, the corresponding courses of terminal wale loops of the stocking blank may be interknitted with narrow knitted fabric. This narrow knitted fabric may comprise regular courses and wales of desired number. The narrow knitted fabric may comprise, for example, connected loops forming two or four wales. As an illustration, the knitted seams 11 and 12 may be formed with narrow knitted fabric of two wales in width and may have a loop structure as shown in Figure 4. In Figure 4, the terminal wale loops in two opposite fabric edges are identified by the numerals 15 and 16 respectively and the seaming yarn forming the narrow knitted fabric is identified by the numeral 17.

The stocking blank may next be provided with a seam for its selvage edges. A back leg seam 20 is provided for the opposite selvages extending from the heel seam 11 to the top edge 9 of the stocking. A sole seam 21 is similarly provided for the opposite selvages extending between the heel and toe seams 11 and 12.

Figure 5:
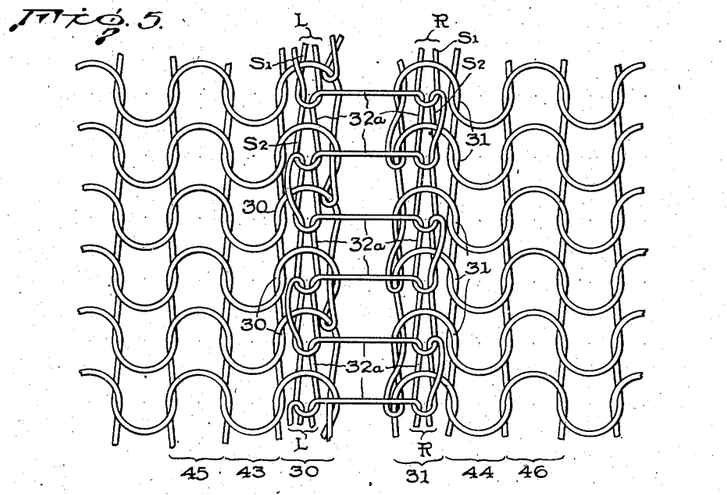
Figure 5 is a more or less diagrammatic illustration of one form of loop structure for the leg and sole seams of the stocking shown in Figure 3.

As the back leg seam 20 and the sole seam 21, according to a preferred embodiment of this invention, are formed by the same method and have the same loop structure, it will only be necessary to explain one of these two seams (20 and 21) in detail. One form of loop structure for the seams 20 and 21 is more or less diagrammatically illustrated in Figure 5. In this Figure 5, the end or outermost wales forming the opposite stocking edges are numbered 30 and 31 respectively, and the seaming yarn is numbered 32a. The seaming yarn 32a is knitted into what may be termed narrow knitted fabric since it comprises courses and wales, there being two wales, L and R, and the loops of these two wales forming two parallel columns. The loops of seaming wale L are interlooped or interknit with the loops of stocking edge wale 30 and the loops of seaming wale R are interlooped or interknit with the loops of the stocking edge wale 31. It will also be noted that Figure 5 shows each loop in the edge wales 30 and 31 interlooped with a loop formed from the seaming yarn 32a and that each of the seaming wales L and R is interlooped with only one of the two edge wales 30 and 31.

Figure 6:
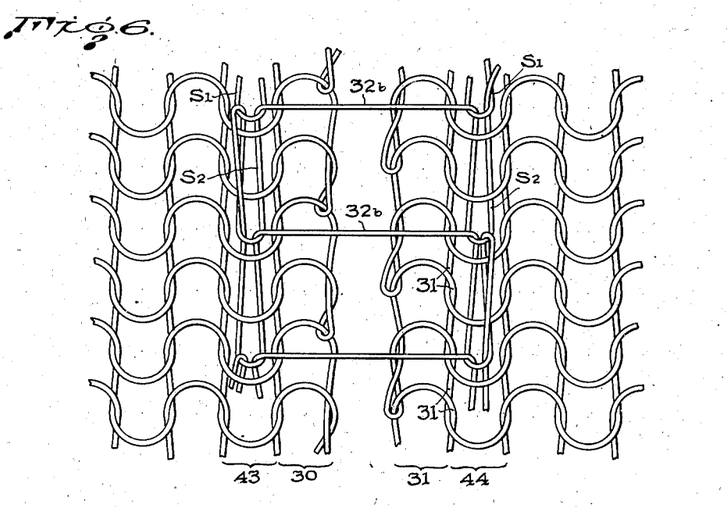
Figure 6 shows another form of seam loop structure embodying this invention.

Since the edges having the wales 30 and 31 are of selvage construction, that is their loops are not free to start a run, it is not necessary that each and every loop in the two edge wales 30 and 31 be interlooped with a loop of the seaming yarn 32a. Nor, is it, in fact, necessary that the seaming yarn be interknit with the outermost wale at each stocking edge. For example, a seam (20 or 21) may be formed, as illustrated in Figure 6, by having a seaming yarn 32b interlooped with alternate loops in each of the wales 43 and 44 next to the outermost wales 30 and 31. In the structure of Figure 6, the loops of the seaming yarn 32b are somewhat longer than the corresponding loops of Figure 5, and each of the wales of the seaming yarn 32b is interlooped with but one of the fabric edges as in the seam structure of Figure 5.

Figure 7:
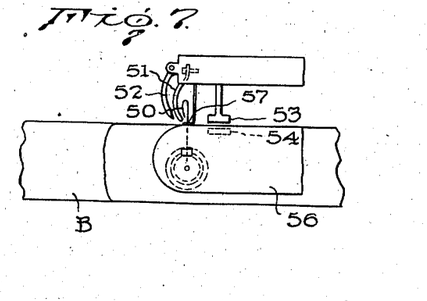
Figures 7 and 8 are respectively side and end elevational views of part of a knitting machine for performing the method of the present invention.
Figure 8:
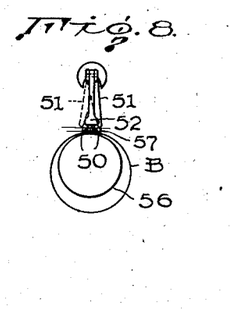
Figure 9:
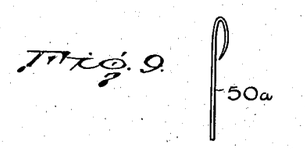
Figures 9 and 10 are views of two forms of needles which may be used in the machine of Figures 7 and 8.
Figure 10:
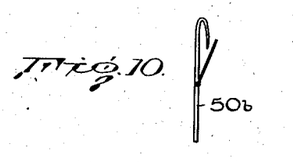

The back leg and sole seams 20 and 21 may be formed on a knitting machine of the type illustrated in part in Figures 7 and 8. This machine comprises a group of needles 50, which may be two in number and which are secured to a common support or driving element so as to reciprocate together and in a vertical direction. These needles may be of the spring beard type 50a as illustrated in Figure 9 or of the latch type 50b as illustrated in Figure 10. The seaming yarn is fed to the needles 50 by a yarn carrier or feeding device 51. This yarn carrier 51 may be pivotally mounted and oscillated between the full line and dotted line positions illustrated in Figure 8. The yarn feeding tip or lower end of the yarn carrier 51 is so supported that it travels close to the stems of the needles 50 and below their heads or beards.

If the needles 50 are of spring beard type (see 50a and Figure 9), the machine is provided with an oscillating presser member 52. The presser member 52 is so pivotally mounted and actuated as to oscillate toward and away from the beards of the needles 50. This oscillation is such that the presser member 52 presses the spring beards of the needles 50 to the closed position as the needles travel in their downward movement. The machine also includes a stationary presser foot 53 and a cooperating feeding device 54 for feeding the stocking in the seaming operation.

In starting a seaming operation, the operator may feed the salvages of the stocking blank B to the needles 50. After the stocking blank B has advanced to and been engaged by the feeder device 54, the latter provides the stocking feeding movement and the operator need only guide the stocking selvages for proper engagement by the needles 50. The stocking blank B is preferably so fed to the needles 50 that the latter in their upward movement enter the blank adjacent the edges thereof, and the left needle 50 enters the left blank edge, while the right needle 50 enters the right blank edge, as illustrated in Figure 8. The stocking blank B may be so fed and guided that the two needles 50 pass through loops in the edge wales 30 and 31 respectively (see Figure 5) or through loops in the stocking blank wales adjacent the edge wales 30 and 31 (see, for example, Figure 6).

Figure 11:
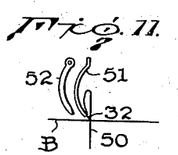
Figures 11 through 19, inclusive, illustrate diagrammatically how the yarn carrier and the presser member of the machine of Figures 7 and 8 cooperate with each needle in forming the seaming yarn into a line of loops and in interknitting these seaming loops with the stocking blank.
Figure 12:
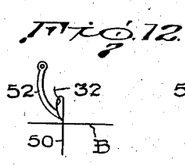

The knitting of the stocking seam and the narrow seaming fabric may proceed in the following manner. With the needles 50 in their upper position (see Figures 7, 8 and 11) and extending through loops in the opposite edges of the stocking blank B, the yarn carrier 51 is pivotally moved to lay its yarn 32 below the beards of both the needles 50. The needles 50 are now moved downwardly and completely clear of the stocking blank B (see Figure 13). As the needles 50 travel downwardly, the yarn just laid by the yarn carrier 51 is caught in the needle heads and each of the needles 50 pulls a seaming yarn loop $S_1$ through the corresponding loop of the stocking blank edge with which the needle is engaged. As the needles 50 are being lowered, the presser member 52 is in a position (see Figure 12) to close the needle beards, so that they will not catch or snag the stocking blank, and the newly laid yarn will be retained by the needle heads. While the seaming loops $S_1$, which are held by the needles 50, are extending through the stocking blank B, the latter is given a feeding movement (see Figures 13 and 14) corresponding to one or more courses of the stocking blank fabric. This feeding movement may be of any desired extent. Preferably, the feeding movement is not more than the distance corresponding to three or four courses of the stocking fabric.

Figure 14:
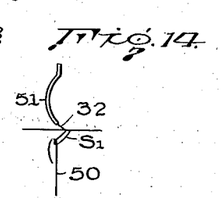
Figure 15:
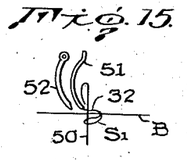
Figure 16:
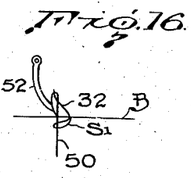
Figure 17:
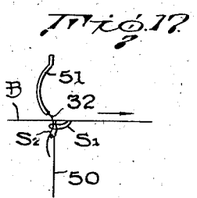
Figure 18:
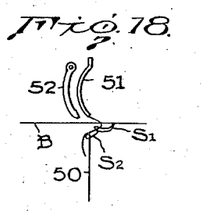
Figure 19:
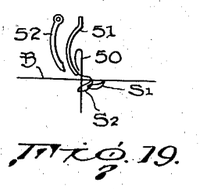

After each feeding movement of the stocking blank B, the needles 50 are raised and again pass into the fabric (see Figure 15). Each needle 50 slides in its respective loop $S_1$ (see Figures 14 and 15) and the loop remains substantially on the under side of the fabric as illustrated in Figure 15. The yarn carrier 51 now executes another or return stroke to lay additional yarn (32) along the needles 50 for another course of seaming loops $S_2$. During this yarn feeding movement, the presser member 52 is in a retracted and inoperative position (see Figure 15). At the conclusion of the yarn feeding movement, the presser member 52 moves forwardly and presses the needle beards to the closed position (see Figure 16). The needles 50 are then lowered through the blank B and the loops $S_1$ of the preceding course and thereby form new loops (see Figure 17 and new loop $S_2$) which are interlooped with stocking blank fabric loops and the loops ($S_1$) of the preceding course of seaming yarn (see Figures 5, 6 and 17). If desired, any suitable means may be provided to maintain the beards of the needles 50 in their closed position until the previously formed loop ($S_1$ for example) has slipped entirely off of the needle head and is interlooped with the new loop ($S_2$). Each needle 50 now is freed of its corresponding loop ($S_1$) in the preceding course, but retains the loop ($S_2$) last formed thereby as shown in Figure 17. The blank B is then given a further feeding movement (see Figures 17 and 18), after which the needles 50 are again raised to pass into the fabric as shown in Figure 19. It will be noted that the last formed loops (see loop $S_2$ in Figure 19) are now disposed below the stocking fabric or blank B and on the needle stems.

During the vertical movements of the needles 50, that is while they are entering and being withdrawn from the stocking blank, the portions of the stocking blank B adjacent the needles may be held against vertical movement in any suitable way. It is desirable that these stocking blank fabric portions be so held that they do not partake of the needle movements. In the seaming operation, the stocking blank B may rest on the arm 56 which supports the needles 50 and the needle actuating mechanism. The stocking blank B is shifted along the arm 56 in the seaming operation and passes below a guide or foot member 57. This guide 57 serves to hold the stocking blank edges close to the arm 56 during the intervals when the needles 50 are being raised into and through the blank B.

The above series of yarn laying, needle beard pressing, needle lowering, fabric feeding, and needle raising operations are repeated in the order named until the stocking seam is completed. If desired, the seaming operation may be continuous from the top of the stocking blank B to the heel seam 11, may then be discontinued for the extent of the heel seam 11, and may then be followed in forming a knitted seam for the sole edges between the heel and toe seams 11 and 12. Or if desired, the knitting of the leg and sole seams 20 and 21 may be performed in a continuous operation by continuing to knit the seaming yarn 32, after the back leg seam 20 is completed, and interlooping, in the manner above described, the seaming yarn (32) with the stocking fabric along the length of the seam 11. The seaming operation would then, without interruption, be continued to knit together the remaining selvage edges to form the sole seam 21. In order to anchor the end of the seaming yarn (32), the knitting and interlooping of the seaming yarn (32) may be continued past the seam 12 and into the toe fabric 6 to a suitable extent.

The welt 1 may be a conventional turned welt, that is the top of the stocking is folded and interknitted with a lower portion of the stocking fabric. The seam for the selvage edges of this welt 1 (that is, the upper portion of leg seam 20) may be formed by first seaming the inner fold of the welt fabric and then seaming the outer fold thereof in a continuous operation and according to any one of the seaming operations described herein for uniting selvage edges.

Figure 20:
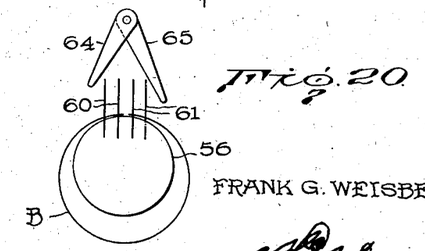
Figure 20 shows more or less diagrammatically certain details of a modified form of machine for performing the method of the present invention.

The invention may also be practiced with a machine having more than two needles. For example, four needles (60, 61) may be used as illustrated in Figure 20. In this event, two needles (60) may cooperate with one fabric edge of the stocking blank B in interknitting the same with seaming yarn and the other needles (61) may similarly cooperate with the other fabric edge as also illustrated in Figure 20. Where four needles are used, the narrow fabric will be four wales in width and each edge of the stocking blank may be interlooped with two wales of the narrow knitted fabric or seaming yarn. Whether two, four, or other number of needles is used, the knitting and seaming operations may be substantially the same as described above in connection with Figures 11 through 19.

If latch needles 50b such as shown in Figure 10 are used in place of the spring beard needles of Figure 9, the presser member 52 is preferably omitted. The latch of the latch type needles 50b will have opening and closing movements corresponding to that of the beard of the spring beard needles 50a, and the latch needles will provide a seam similar to that described in connection with spring beard needles.

This invention may also be practiced with a machine having two yarn carriers (64 and 65) pivotally mounted on aligned axes and simultaneously operated (oscillated) in opposite directions. Such an arrangement of yarn carriers (64 and 65) is shown in Figure 20. Each yarn laying operation will thus feed two yarns to each of the knitting needles (60, 61 for example), and the narrow knitted or seaming fabric will be formed of reinforced or two-ply construction throughout as in plated or spliced fabric. In each lowering movement of the needles (60, 61), each needle will pull two seaming loops through the stocking fabric, the two loops being formed from separate yarns—the yarns fed by the two yarn carriers 64 and 65.

Figure 21:
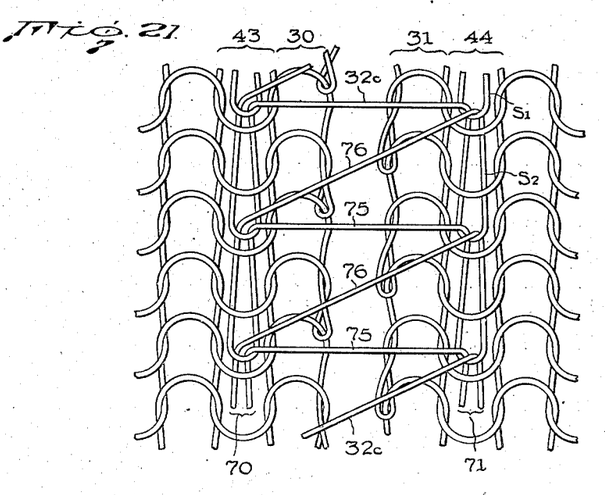
Figures 21 and 22, respectively, illustrate diagrammatically two further seam structures embodying this invention.
Figure 22:
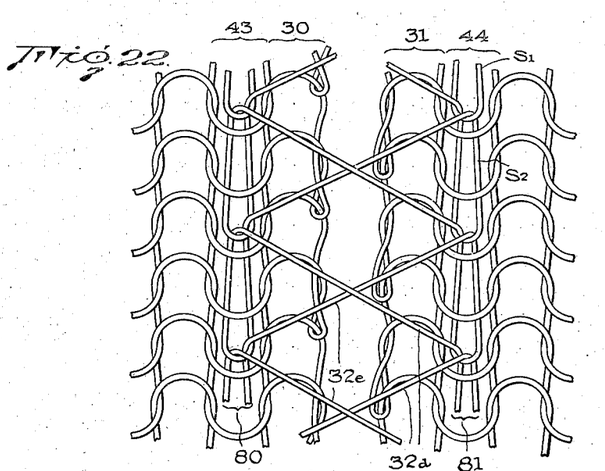

Other seam structures embodying this invention are illustrated in Figures 21 and 22. According to Figure 21, a seaming yarn 32c is knitted to form narrow fabric comprising two wales 70 and 71, each individual loop of the seaming yarn 32c being interknitted or interlooped with a stocking fabric wale (43 or 44) adjacent an outermost wale (30 or 31) of anti-raveling construction. The seam of Figure 21 may be formed on a machine similar to the one shown in Figures 7 and 8, and may, with the exceptions noted below, be formed according to the general method explained above with reference to Figures 5, 6 and 9 through 19.

In forming the seams of Figures 5 and 6, the yarn carrier 51 makes a stroke each time the needles 50 are brought to their raised position (see Figure 11), and idles at other times.

Figure 13:
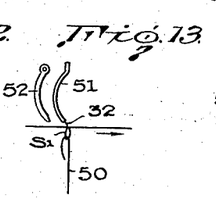

In forming the seam of Figure 21, the yarn carrier 51 makes a stroke in one direction each time the needles 50 arrive at their raised position (see Figure 11) and a return stroke in the reverse direction each time the needles are brought to their lowered position (see Figures 13 and 14). In each stroke of the carrier 51 while the needles 50 are in the raised position, the carrier 51 lays its yarn below the needle beards. This operation of the yarn carrier 51 results in the formation of the horizontally and diagonally extending portions 75 and 76, respectively, of the seaming yarn 32c. The horizontal portions 75 occur as the result of the yarn carrier 51 feeding yarn to the needles 50 in their raised position. In the return or reverse stroke of the carrier 51, it lays the yarn forming the diagonal portions 76. It is, therefore, a characteristic of the Figure 21 embodiment that the two yarn ends of each seaming loop (see S2 for example in Figure 21) extend across the seam and to the seaming wale (70 for example) at the opposite side of the seam.

Figure 23:
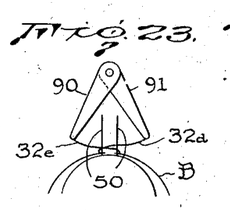
Figure 23 illustrates more or less diagrammatically a modified form of the machine shown in Figures 7 and 8.

The seam of Figure 22 may be produced by a machine such as illustrated in Figure 23, and may, with the exceptions noted below, be formed in accordance with the general method illustrated by Figures 11 through 19 for producing the seams of Figures 5 and 6.

As previously explained, the seams of Figures 5 and 6 are produced by the machine of Figures 7 and 8 which has a single yarn carrier 51. This yarn carrier 51 executes a stroke each time the needles 50 are raised to their upper position. This operation of the yarn carrier 51 results in the ladder effect for the seam as shown in Figures 5 and 6.

Figure 24:
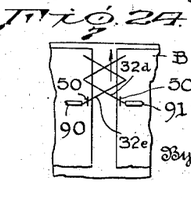
Figure 24 illustrates diagrammatically a seam in the course of being formed by the machine of Figure 23.

The machine of Figure 23 for producing the seam structure of Figure 22 is provided with two yarn carriers 90 and 91, but may otherwise be the same in structure as the machine of Figures 7 and 8. These two yarn carriers 90 and 91 may be pivotally mounted for oscillation about aligned axes and are adapted to be actuated simultaneously in reverse directions. The two yarn carriers 90 and 91, in forming the seam of Figure 22, lay the yarns 32e and 32d and are operated each time the needles 50 are in their lowered position (see Figures 13 and 14). In other words, the yarn carrier 90, for example, travels to the right and the yarn carrier 91 travels to left (looking at Figure 23), when the needles 50 have completed one downward movement. Each of the yarn carriers 90 and 91 then makes a return stroke, when the needles 50 have completed their next downward movement (see Figures 17 and 18). This operation of the yarn carriers 90 and 91, and the feeding movement of the stocking blank B while the needles are in their lowered position (see Figures 13 and 14), results in the two yarns 32e and 32d being laid across the seam in diagonal lines that intersect one another as shown in Figure 22. While the needles 50 are in their lowered position and either before or after the corresponding yarn laying operation of the carriers 90 and 91, the blank B is given a feeding movement (see Figures 13 and 14) corresponding to the number of courses of seaming yarn desired in each inch of the seam. This feeding movement of the blank B may correspond to the height of one or a few (for example two or three) of the courses in the fabric of blank B. After each yarn laying operation of the two yarn carriers 90 and 91, the needles 50 are raised through the selvage edges of the blank B. The portions of the yarns 32d and 32e extending from the yarn carriers 90 and 91 now lie diagonally across the seam and intersect each other as will be clear from Figure 22. As the needles 50 rise above the blank B, the yarns 32d and 32e slip under the beards of the needles 50 as illustrated more or less diagrammatically in Figure 24. In the subsequent downward travel of the needles 50, each spring beard will catch the yarn of the adjacent yarn carrier (90 or 91) and pull a loop of such yarn through the stocking blank B.

The seam of Figure 22, due to the diagonal arrangement of the loop connecting portions of the seaming yarns 32d and 32e, is of a construction which may stretch in both lateral and longitudinal directions. This two-way stretch feature of the Figure 22 seam makes the latter well adapted to meet the conditions to which stocking seams are subjected.

When stockings are being placed on the wearer, as well as when the stockings are actually being worn by an individual, the stocking seams are frequently placed under tension. The sewed seams of conventional stockings are relatively inelastic, so that, when placed under tension, they are apt to either break open or tear away from the adjacent stocking fabric. This objection to conventional sewed seams is substantially avoided by a seam such as in Figure 22 as it is of a construction which will yield both laterally and longitudinally when placed under tension, and which will return to its normal shape and condition when relieved of tension.

As the fabric or stocking blank edges which are included in the seams 20 and 21 have a selvage construction, the seaming operation therefor does not require the precision demanded in looping operations for seaming end courses of terminal wale loops. The interlooping of the narrow seaming fabric and the selvages, therefore, need not be as regular as that illustrated in Figures 5 or 6. For example, a satisfactory seam for the leg fabric may be secured, although each knitting needle does not always enter the same wale throughout the knitting of the leg seam 20. Each needle, at various times in knitting the leg seam 20, may possibly engage each of a number of adjacent wales including or lying along the side of the outermost wale of the corresponding selvage, although in any single interlooping operation, such as illustrated by Figures 11 through 14, a needle would ordinarily work on only one wale of the stocking blank.

The terms selvages and selvage edges as used in the appended claims refer to marginal portions of knitted fabric. These marginal portions each include an outermost wale having an anti-raveling construction and may also include one or more wales adjacent the outermost wale. In providing a seam to unite two opposite selvage edges of finely knitted fabric such as used in ladies' hosiery, it is not essential that the seaming yarn be joined directly to the outermost wale of each edge. The union of the seaming yarn with the knitted fabric may vary over the width of a marginal portion, which, as explained, may comprise a group of two or three wales including the outermost wale of anti-raveling construction. For example, in knitting the upper part of the leg seam 20, the seaming yarn may be interlooped with the outermost wale (see wales 30 and 31 of Figure 5) at each edge of the stocking blank. Further down the leg seam 20, the seaming yarn may possibly be interlooped with the wales (see wales 43 and 44 of Figures 5, 6, 21, and 22) next to the outermost wales at the opposite edges of the stocking blank B. Still further down the leg seam, the seaming yarn may be interlooped with the third wale (see wales 45 and 46 of Figure 5) of each edge of the stocking blank. This variation in the seaming operation may occur without objectionably or materially affecting the appearance and other desirable characteristics of a finished stocking and its seam. The marginal portion may thus comprise a number of wales including an outermost wale of selvage construction and preferably consists of a group of two or three wales including a selvage wale.

The seaming operations of this invention for selvage edges are preferably such that they are confined to marginal portions of about three wales in width so that the resulting seam is relatively narrow and flat and substantially less bulky than the relatively thick, rib-like leg seams of conventional hosiery. The relatively heavy and rib-like stocking seams which are formed in conventional sewing operations usually include opposite marginal, stocking blank portions, each of which is from four to eight wales in width. It will thus be evident that the present invention not only provides an improved seam structure and improved seaming method, but also provides economy in yarn as the stocking blank for any particular size stocking may now be made narrower by as much as twelve wales.

It will be understood that the foregoing is illustrative and that this invention includes all modifications and embodiments coming within the scope of the appended claims.

I claim:

1. Knitted fabric having a knitted seam, said seam comprising selvage edges of the fabric united by yarn knitted into courses and wales.

2. A stocking comprising fabric having opposite edge portions of selvage construction, and yarn knitted into connected courses and wales and interlooped with said opposite selvage edge portions to form a knitted seam therefor.

3. A full-fashioned stocking comprising flat knit fabric formed of wales and courses and having opposite edge portions of selvage construction, and yarn knitted into wales and courses and interknitted with said opposite selvage edge portions to form a knitted stocking seam.

4. A full-fashioned stocking comprising flat knit fabric formed of wales and courses and having opposite edge portions of selvage construction, and yarn knitted into wales and courses and interknitted with said opposite selvage edge portions to form a knitted stocking seam, said yarn wales extending longitudinally of said seam.

5. A full-fashioned stocking comprising flat knit fabric formed of wales and courses and having opposite edge portions of selvage construction, and yarn knitted into wales and courses and interknitted with said opposite selvage edge portions to form a knitted stocking seam, one or more of said yarn wales being interknitted with one of said opposite selvage edge portions, and a different one or more of said yarn wales being interknitted with the other of said opposite selvage edge portions.

6. A full-fashioned stocking of flat knit fabric having opposite selvages united by yarn to form a seam therefor, said yarn being knitted into loop formation, a plurality of loops of said yarn being interknitted with one of said selvages and a plurality of other loops of said yarn being interknitted with the other of said selvages, at least a substantial number of said interknitted loops being interknitted with only a single selvage.

7. A full-fashioned stocking comprising flat knit fabric including the stocking leg, instep, sole, heel and toe fabric portions, and said leg and sole portions each being formed at least in part with opposite selvage edges, and narrow knitted fabric interknit with said opposite selvage edges to provide knitted seams therefor.

8. A full-fashioned stocking of flat knit fabric having selvage edges for at least the leg and sole portions of the stocking, and yarn interknitted with opposite selvage edges to provide a seam for at least a substantial part of the length of the stocking, said seam being substantially flat both in structure and appearance, and said yarn being knitted into loops, no one of which is interknit with more than one of said selvage edges.

9. A full-fashioned stocking of flat knit fabric having the side edges of the leg portion joined by knitted yarn to form a back leg seam for the stocking, said knitted yarn having a plurality of its loops interknitted with only one of said side edges and having a plurality of other loops interknitted with only the other of said side edges.

10. A stocking comprising leg and sole fabric, the opposite edges of said fabric meeting at a line at the back of the stocking leg and at a line along the sole of the stocking foot, and narrow knitted fabric interknitted with said fabric to unite said edges and provide the stocking with leg and sole seams.

11. Knitted fabric having a knitted seam, said seam comprising at least the edge or outermost wales of two opposite fabric edge portions, and a seaming yarn knitted to form two or more wales and interlooped with wales in both of said fabric edge portions, at least one of said seaming yarn wales for at least part of its length being interlooped with only one of said fabric edge portions.

12. A stocking comprising leg fabric, the opposite edges of said fabric meeting at the back of the stocking leg, and yarn knitted into connected courses and wales and interlooped with at least certain opposite edge portions of said fabric to form a seam therefor.

13. A full-fashioned, flat knit stocking comprising leg fabric having selvage edges, and narrow knitted fabric interknit with said selvage edges to form the back leg seam of the stocking.

14. A stocking comprising foot fabric, the opposite edges of said fabric meeting at the sole of the stocking foot, and yarn knitted into connected courses and wales and interlooped with at least certain opposite sole edge portions of said fabric to form a seam therefor.

15. A full-fashioned, flat knit stocking comprising sole fabric having selvage edges, and narrow knitted fabric interknit with said selvage edges to form the sole seam of the stocking.

16. Knitted fabric having a knitted seam, said seam comprising at least two fabric selvage edges united together by means of seaming yarn, said yarn being in the form of two ply fabric having knitted courses and wales and being interlooped with said edges.

17. Knitted fabric having a knitted seam, said seam comprising at least two fabric selvages interlooped with seaming yarn, said yarn being knitted and forming a plurality of courses and at least two wales.

18. Knitted fabric having a knitted seam, said seam comprising at least two fabric selvages interlooped with seaming yarn, said yarn being knitted and forming a plurality of courses and four wales.

19. A full-fashioned, flat knit stocking formed entirely of knitted fabric.

20. A seam structure for selvage edges of knitted fabric comprising yarn knitted into narrow fabric and interknitted with said selvage edges; said narrow fabric being formed of loops and loop connecting portions, and courses and wales; each of a plurality of said loops having both of its loop connecting portions extending across the seam to loops in another wale.

21. A seam structure for selvage edges of knitted fabric comprising yarn knitted into narrow fabric and interknitted with said selvage edges; said narrow fabric being formed of loops and loop connecting portions, and courses and wales; each of a plurality of said loops having one of its loop connecting portions extending to another loop in the same course and having the other loop connecting portion thereof extending to a loop in another course and in another wale.

22. A seam structure for selvage edges of knitted fabric comprising yarn knitted into narrow fabric and interknitted with said selvage edges; said narrow fabric being formed of loops and loop connecting portions, and courses and wales; each of a plurality of said loops having its loop connecting portions extending to two other loops in other courses and in another wale.

23. A seam structure for selvage edges of knitted fabric comprising yarn knitted into narrow fabric and interknitted with said selvage edges; said narrow fabric being formed of loops and loop connecting portions, and courses and wales; each of the loop connecting portions in at least a substantial portion of said narrow fabric extending between different wales and crossing another loop connecting portion.

24. A seam structure for selvage edges of knitted fabric comprising two yarns knitted into narrow fabric and interknitted with said selvage edges; said narrow fabric for at least a substantial part thereof being formed into courses and wales of single yarn loops, having alternate loops in at least one wale thereof formed by one of said yarns, and having the remaining loops of said wale formed by the other of said yarns.

25. A seam structure for selvage edges of knitted fabric comprising yarn knitted into narrow fabric and interknitted with said selvage edges; said narrow fabric being formed of loops and loop connecting portions, and courses and wales; each loop having the loop connecting portions thereof extending obliquely across the seam; and the loop connecting portions of loops in the same course crossing each other between wales.

26. The method of forming a stocking from a full-fashioned flat knit stocking blank having selvages for at least part of the edges thereof, which method comprises knitting yarn to form connected, successive courses, and interknitting said yarn with said stocking blank during the knitting of said courses to form a seam for said selvages.

27. The method of forming a stocking from a full-fashioned flat knit stocking blank having selvages for at least part of the edges thereof, which method comprises knitting yarn on a group of needles to form said yarn into a series of connected courses, and feeding opposite selvages of said blank to said needles during the formation of said courses to interknit said courses and selvages and thereby form a seam for said selvages.

28. The method of forming a stocking from a full-fashioned flat knit stocking blank having selvages for at least part of the edges thereof, which method comprises knitting yarn on a group of needles to form said yarn into a series of connected courses, and feeding opposite selvages of said blank to said needles during the formation of said courses to interknit said courses and selvages and thereby form a seam for said selvages, one of said two opposite selvages being fed to one or more of said needles, and the other of said selvages being fed to a different one or more of said needles, whereby said opposite selvages are separately interknitted with said yarn.

29. The method of forming a stocking from a flat knit stocking blank having leg fabric, sole fabric, toe fabric and heel fabric, said method comprising forming seams for said toe fabric and said heel fabric, knitting narrow fabric, and interknitting said leg fabric and said sole fabric with said narrow fabric to provide the stocking leg and sole seams.

30. The method of forming a stocking from a flat knit stocking blank having leg fabric, sole fabric, toe fabric and heel fabric, said method comprising forming seams for the end edges of said toe fabric and said heel fabric, knitting narrow fabric, and interknitting said narrow fabric with the opposite edges of said leg and sole fabrics and with the side edges of said toe and heel fabrics to form a complete stocking from said stocking blank.

31. The method of forming a stocking from a flat knit stocking blank having leg fabric, sole fabric, toe fabric and heel fabric, said method comprising forming seams for the end edges of said toe fabric and said heel fabric, knitting narrow fabric, and interknitting said narrow fabric with the opposite edges of said leg and sole fabrics and with the side edges of said toe and heel fabrics to form a complete stocking from said stocking blank, said opposite edges being individually interknit with different wales of said narrow fabric.

32. The method of forming a stocking from a flat knit stocking blank having leg fabric, sole fabric, toe fabric and heel fabric, said method comprising forming seams for the end edges of said toe fabric and said heel fabric, knitting narrow fabric, and interknitting said narrow fabric with the opposite side edges of said leg fabric and heel fabric, with said heel seam, and with the opposite side edges of said sole fabric and toe fabric.

33. In a method of seaming two edges of knitted fabric on a set of needles, the steps of feeding said fabric relatively to said needles, moving said needles into and out of said fabric, laying yarn in one direction across said fabric edges to feed the yarn to said needles each time the needles extend through said fabric, and laying yarn in the reverse direction across said fabric edges each time the needles ar withdrawn from said fabric.

34. In a method of seaming two edges of knitted fabric on a set of needles, the steps of feeding said fabric relatively to said needles, moving said needles into and out of said fabric, and supplying two yarns to said needles to form narrow knitted fabric thereon while simultaneously interknitting said narrow knitted fabric and said fabric edges, said yarns being laid simultaneously in opposite directions across said fabric edges after each withdrawal of said needles from said fabric, and each of said needles in each withdrawal operation engaging one of the yarns laid after the preceding withdrawal operation and drawing a loop of the engaged yarn through said first mentioned knitted fabric.

35. In a method of seaming opposite selvage edges of flat knit hosiery on a set of at least two knitting needles and with two seaming yarns, the steps comprising causing one of said needles to draw a loop of one yarn through one of said selvage edges and another needle to draw a loop of the second yarn through the other of said selvage edges, feeding said selvage edges relatively to said needles after said loop drawing step and while said loops are retained on said needles, laying said two yarns simultaneously in reverse directions across both said selvage edges and after each loop drawing operation, causing said two needles to each draw another loop of said laid yarn through the corresponding selvage edge and the loop previously formed thereon, each needle in each loop drawing operation engaging a seaming yarn extending from the opposite selvage edge, and repeating said feeding, yarn laying and looping drawing steps to form a stocking seam, each of said two needles drawing alternate loops from one of said yarns and drawing the other loops from the other of said yarns.

36. A seam structure in a full-fashioned, flat-knit stocking formed of courses and wales having opposite edge portions of selvage construction, said seam structure comprising narrow fabric of regular courses and wales, one or more of said narrow fabric wales being interknitted with one or more wales forming one of said edge portions, and another one or more of said narrow fabric wales being interknitted with one or more wales forming the other of said edge portions.

37. A seam structure in full-fashioned hosiery of flat-knit fabric having opposite edge portions of selvage construction and being formed of wales and courses with the wales extending substantially parallel to said edge portions, said seam comprising narrow knitted fabric interknitted with wales of said flat-knit fabric adjacent to the outermost wale in each of said edge portions.

38. A seam structure in full-fashioned hosiery of flat-knit fabric having opposite edge portions of selvage construction and being formed of wales and courses with the wales extending substantially parallel to said edge portions, said seam structure comprising narrow knitted fabric interknitted with said opposite edge portions, the interknitting for at least part of the length of the seam being limited to the three outermost wales of each of said edge portions.

39. A stocking comprising flat knit leg fabric and flat knit foot fabric, each of said fabrics having opposite edge portions of selvage construction, narrow knitted fabric interknitted with said opposite leg selvage edge portions to unite the same, and narrow knitted fabric interknitted with said opposite foot selvage edge portions to unite the same, whereby at least part of the stocking leg seam and at least part of the stocking foot seam are of knitted construction.

FRANK G. WEISBECKER.